| United States Patent [19] | [11] | 4,049,598 |
|---|---|---|
| Peerman et al. | [45] | Sept. 20, 1977 |

[54] AMINO-POLY(AMIDAZOLINE-AMIDE)

[75] Inventors: Dwight E. Peerman, Minnetonka; Dale G. Swan, St. Louis Park; H. Gordon Kanten, Minneapolis, all of Minn.

[73] Assignee: General Mills Chemicals, Inc., Minneapolis, Minn.

[21] Appl. No.: 703,035

[22] Filed: July 6, 1976

[51] Int. Cl.$^2$ .............................. G08G 69/26
[52] U.S. Cl. ..................... 260/18 N; 260/23 H; 260/78 R; 260/78 TF; 260/857 L; 260/404.5
[58] Field of Search .............. 260/18 N, 23 H, 78 TF, 260/78 R, 404.5 PA, 857 L

[56] References Cited

U.S. PATENT DOCUMENTS

| 2,149,273 | 3/1939 | Carothers | 260/78 TF |
|---|---|---|---|
| 2,886,543 | 5/1959 | Peerman et al. | 260/78 TF |
| 3,326,826 | 6/1967 | Cohen | 260/23 H |
| 3,403,117 | 9/1968 | Floyd | 260/23 H |
| 3,690,811 | 9/1972 | Horning | 260/78 TF |
| 3,834,870 | 9/1974 | Tucker | 260/857 L |

*Primary Examiner*—Eugene C. Rzucidlo
*Attorney, Agent, or Firm*—Patrick J. Span

[57] ABSTRACT

Amino-poly(imidazoline-amide) compositions are disclosed which are useful for occlusion in polyolefins to render them dyeable with acid textile dyes. Polyolefins are useful in textile fibers or filaments. The compositions are certain azelaic acid, polyamide-imidazoline products of a mixture of diethylene triamine and a diamine. Optionally, fatty compounds such as a dimeric fat acid or monomeric fatty acid or another, different aliphatic dicarboxylic acid may be present.

9 Claims, No Drawings

AMINO-POLY(AMIDAZOLINE-AMIDE)

This invention relates to certain amino-poly (imidazoline-amide compositions which are useful for occlusion in polyolefins to render them dyeable with acid textile dyes. Polyolefins are useful in textile fibers or filaments. The compositions are certain azelaic acid, polyamide-imidazoline products of a mixture of diethylene triamine and a diamine. Optionally, fatty compounds such as a dimeric fat acid or monomeric fatty acid or another, different aliphatic dicarboxylic acid may be present.

BACKGROUND OF THE INVENTION

A variety of amine-containing materials has been suggested for use with α-olefin polymers to improve the dye receptivity thereof. In many instances, while dye receptivity or dyeability was improved, the material was not capable of being processed suitably with the olefin polymer. If the additive material does not blend well with the olefin polymer, the dye absorbs non-uniformly, frequently in a streaked or spotty manner.

In U.S. Pat. No. 3,403,117 there is disclosed broadly that polymeric fat acids and polyamides thereof render polymers of alpha olefins anti-static and improve the dye receptivity thereof. The polyamides may contain certain imidazoline linkages if prepared at high temperatures. Further co-dibasic acids and monobasic acids are optionally disclosed for use therein along with the polymeric (substantially dimeric) fat acid.

U.S. Pat. No. 3,326,826 follows generally along the same lines as U.S. Pat. No. 3,403,117 but is directed to more specific polyamide resins in which three compounds are reacted to provide the polyamide. These reactants are (1) dimeric acid (2) a saturated linear dibasic acid and (3) a diamine or polyalkylene polyamine.

SUMMARY OF PRESENT INVENTION

It has now been discovered that a relatively small group of resins possess the desirable properties which meet both processability and dyeability requirements for use with polyolefin polymers, such as polypropylene. Such resins may be classed as amino-poly(imidazoline-amide) resins which thus possess amino groups, amide groups and imidazoline groups. The resins are prepared by the reaction of azelaic acid and a mixture of diethylene triamine and an alkylene diamine. Optionally, another different dicarboxylic acid may be employed along with the azelaic acid. In addition, a fatty compound either a dimeric fat acid or monomeric monocarboxylic acid may also optionally be employed. The resins will further possess an amine number of at least about 75 with a tertiary amine or imidazoline number of at least about 50. The reactants are reacted at a temperature and for a time sufficient to provide the desired imidazoline content (the tertiary amine number being a measure of imidazoline content) required to provide the desirable dyeability and processability properties.

DETAILED DESCRIPTION AND PREFERRED EMBODIMENTS

As indicated above, the amino-poly(imidazoline-amide) resins of the present invention are prepared by reacting azelaic acid with a mixture of diethylene triamine and a diamine. Optionally, there may also be present either another dicarboxylic acid compound different from azelaic acid, or a dimeric fat acid and/or monomeric monocarboxylic fatty acid. It is understood that wherever the acid is employed, the lower alkyl (1-4 carbon atoms) esters may be used in place thereof.

The diamine which may be employed is an alkylene diamine having from 2-6 carbon atoms. The alkylene group may be straight or branched chain. They may be represented by the idealized formula

where R is an alkylene group having 2-6 carbon atoms. Illustrative of such diamines are ethylene diamine, propane (1,3 or 1,2) diamine, butane diamine and hexamethylene diamine. Hexamethylene diamine is the preferred diamine for use in the present invention.

The dibasic or dicarboxylic acid, different from the azelaic acid being used, is an aliphatic dicarboxylic acid having from 6-12 carbon atoms. The linear saturated dibasic acids are preferred which may be ideally represented by the formula

where $x$ is a whole number of 4-10 inclusive. As this acid must be different from azelaic already being used, $x$, of course, cannot be 7. Examples of such dicarboxylic acids are adipic, sebacic and dodecanedioic. Mixtures thereof may also be employed.

The dimeric fat acids are well known and commercially available, generally in the form of mixtures with trimeric or higher polymeric fat acid forms and with residual monomeric fat acids, such acids, however, being predominantly of the dimeric species, i.e., containing at least about 70, more desirably 80%. and preferably greater than 90 or 95% by weight of dimeric fat acids.

The dimeric fat acids (dimerized fatty acids) are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (eleostearic), 10,12,14-octadecatrienoic (pseudo-eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the monoolefinic acids (or the esters thereof) are polymerized at a very slow rate which the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the desired ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization products by vacuum distillation at low pressures, solvent extraction or other known separation procedures. The polymerization product varies somewhat depending on the starting fat acid or mixture thereof and the polymerization technique employed, i.e., thermal catalytic, particular catalyst, conditions of pressure, temperature, etc. Likewise, the nature of the dimerized acids separated from the polymerization product also depends somewhat on these factors although such acids are functionally similar.

Attempts have been made to fully delineate the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler in a study relating principally to the thermal polymerization of normal methyl linoleate, stated that at least two main products had been identified by others as resulting from such polymerization:

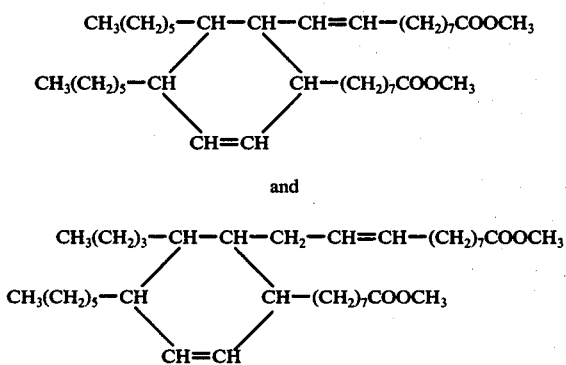

Their experimental work then indicated the latter structure predominated in the thermal polymerization product (The Journal of the American Oil Chemists Society, vo. XXVI, No. 6, June, 1949, pages 278-83). Moore theorized (using the Diels-Alder mechanism) that the polymerization of linoleic acid would yield a variety of 36 carbon atom acids of high structural similarity (Paint, Oil & Chemical Review, Jan. 4, 1951, pp. 13-15, 26-29). A lengthy generalized discussion of the various structures, which description is hereby incorporated by reference, is found in the article.

Ault, et al gave a possible structure of the dimer of methyl α-eleostearate, an ester of an octadecatrienoic acid, as follows:

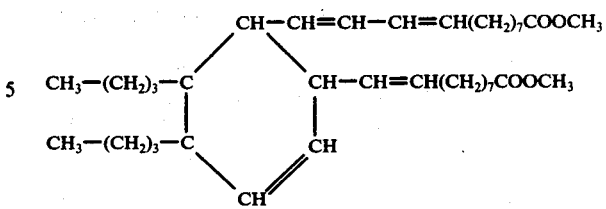

However, they also postulated that the structure could in fact be more complicated. Thus, it was postulated that further cyclic rings were formed due to the high unsaturation giving a compound having the following proposed structure:

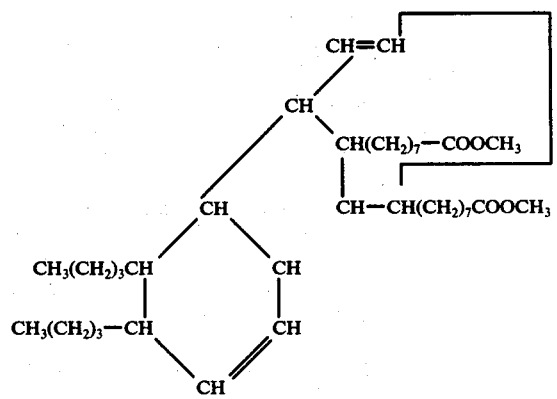

(Industrial and Engineering Chemistry, vol. 34, No. 9, September 1942, pp. 1120-3)

Other information is in essential agreement with the above studies. Thus, analysis of dimerized acids prepared from linoleic acid rich starting materials using heat alone or heat plus a catalyst, such as an acid or alkaline clay, shows that the product contains structurally similar acids having monocyclic tetrasubstituted cyclohexene ring structures as well as acids with two and three rings, such additional rings generally being fused to the six carbon atom ring. Additionally, the clay catalyzed dimerized acids have been shown to contain some aromatic rings according to ultraviolet and infrared spectroscopy. These aromatic rings are believed to be formed by hydrogen transfer (by catalytic action of clay) from the substituted cyclohexene ring to form a substituted benzene ring. Such acids are believed to comprise less than about 20% by weight of the dimerized fat acid. Polymerization of pure oleic acid using a clay catalyst has been shown to yield a mixture of dimerized fat acids of which approximately 25-30% by weight have a tetrasubstituted cyclohexene ring with the remainder being non-cyclic. However, when mixtures of oleic and linoleic acids (such as from tall oil) are polymerized, the resulting dimerized fat acid contains little if any dimer having a non-cyclic structure.

It is thus apparent that the polymerization of the ethylenically unsaturated acids yields complex products. The dimer fraction thereof, which may, however, be admixed with some trimer and monomer, can be assigned the formula:

HOOC—D—COOH where D is a divalent hydrocarbon group containing 30 to 42 carbon atoms. It is also apparent that said divalent hydrocarbon group is complex. However, from the noted studies and other information that we have obtained, it can be seen that a mixture of acids normally results from the polymerization and subsequent fractionation and these acids have structural and functional similarities. Thus, such mixture of acids contains a significant proportion of acids having a six carbon atom ring (about 25% or more even when the starting fat acid is a monoolefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Such dimeric acids may be considered as having a theoretical idealized, general formula as follows:

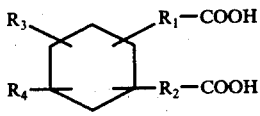

where $R_1$ and $R_2$ are divalent hydrocarbon radicals, $R_3$ and $R_4$ are monovalent hydrocarbon radicals and the sum of the carbon atoms in $R_1$-$R_4$ is 24-36. The ring contains one double bond. It is also understood that the $R_1$-$R_4$ radicals may form one or more additional cyclic structures which are generally fused to the first ring. It is further understood that the ring or rings may be saturated such as where the dimer acids are hydrogenated under conditions which convert the unsaturated acids to the corresponding saturated compounds.

As a practical matter, the dimeric fat acids are preferably prepared by the polymerization of mixtures of acids (or the simple aliphatic alcohol esters, i.e., the methyl esters) derived from the naturally occurring drying and semidrying oils or similar materials. Suitable drying or semidrying oils include soybean, linseed, tung, perilla, oiticica, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40-45% linoleic and 50-55% oleic. It is also preferred to carry out the polymerization in the presence of a clay. Partial analysis of the dimer fraction obtained from the product prepared by polymerizing the tall oil fatty acids in the presence of 10% by weight of an alkaline montmorillonite clay at a temperature of 230° C. and a pressure of about 140 psi for five hours showed that it was a mixture of $C_{36}$ acids, one significant component being

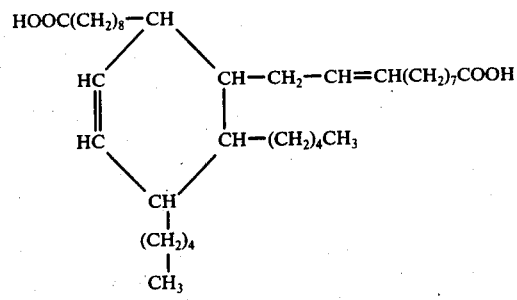

Reference has been made above to the monomeric and trimeric fat acids which may be present along with the dimeric acids. The amounts of monomeric fat acids, often referred to as monomer (M), dimeric fat acids, often referred to as dimer (D), and trimeric or higher polymeric forms, often referred to as trimer (T), may be determined by gas liquid chromatography (GLC) of the methyl esters of the polymeric fat acids. In this method of analysis, an intermediate (I) is seen between the monomer and dimer forms. It is desirable that this intermediate be low, but polymeric fat acids generally having less than 10% and preferably less than 6% intermediate by weight, are satisfactory. Unless otherwise indicated, this analytical method was employed in the analysis of the polymeric fat acids employed in this invention.

The polymeric fat acids may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst, as illustrated in U.S. Pat. No. 3,256,304.

The monomeric, monocarboxylic fatty acid, which may be optionally employed, is one having from 16 to 22 carbon atoms which may be saturated or unsaturated. The preferred acids are those having 18 carbon atoms, such as the saturated stearic acid and the ethylenically unsaturated acids such as oleic acid, linoleic acid and linolenic acid. Other representative 18 carbon atom unsaturated acids are those discussed above in regard to the dimeric fat acids. Ideally the monomeric fatty acid may be represented by the formula

R'COOH where R' is a monovalent, saturated or unsaturated, straight or branched chain aliphatic hydrocarbon radical having from 15 to 21 carbon atoms.

In general the amino-poly(imidazoline-amide) products of this invention are prepared by reaction at a temperature and time sufficient to provide a tertiary amine or imidazoline number or value of at least about 50. In the products of this invention the tertiary amine number is a measure of the imidazoline content of the product. Those products having a tertiary amine number of at least 50 provide the desired dyeability and processability properties. The total amine number or value of the product will be at least about 75. Total amine number is a measure of the primary, secondary and tertiary amine groups in the product.

The amine number (total) is defined as the number of milligrams of potassium hydroxide equivalent to the amine alkalinity present in a one gram sample of resin. The tertiary amine number may be defined as the milligram of potassium hydroxide equivalent to the tertiary amine (imidazoline in this case) present in a one gram sample of the resin. Both are determined by potentiometric titration of a small sample dissolved in nitrobenzene containing acetic acid, using perchloric acid (0.1N) for titration. The difference in the methods of determining total in contrast to tertiary amine lies in the use of phenylisothiocyanate to first react with the primary and secondary amino groups in the sample to form non-basic thioureas.

The tertiary amine or imidazoline numbers herein were determined analytically on a sample weighing about 0.45 grams which was dissolved in nitrobenzene (40 ml.) containing 5 ml. of isopropyl alcohol. Using 5 ml. of phenylisothiocyanate the sample was reacted at 65° C. to form non-basic thioureas with the primary and secondary amino groups of the sample. After adding an additional 5 ml. of isopropyl alcohol and 50 ml. of glacial acetic acid, the sample was titrated potentiometrically with 0.1N perchloric acid. The tertiary amine or imidazoline numer is then calculated by multiplying the ml. of perchloric acid by the normality thereof by 56.1 and dividing by the weight of the sample.

The total amine number is obtained and calculated in substantially the same manner after potentiometric titration of a sample dissolved in nitrobenzene using 0.1N perchloric acid, but omitting the phenylisothiocyanate reaction. Since the primary and secondary amine groups are not reacted to form non-basic thioureas, the total amine number is obtained in the calculation.

Generally, the desired tertiary amine number is obtained by reaction of the acid and amine components in the temperature range of about 235°–315° C. accompanied by removal of any by-product water (or, in the case of the use of esters, an alcohol). The reaction is most desirably carried out at above 250° C. and preferably, however, at temperatures in the 275°–295° C. range. The time of reaction will vary widely dependent on temperatures and the degree of tertiary amine desired. Normally a time period of about 1–4 hours is required after reaching the selected temperature. The preferred time of reaction is 1–2 hours at temperatures in the 250°–300° C. range. Vacuum may be applied, if desired, to withdraw volatile by-products and to keep the reaction mixture from contact with air which may cause darkening. An inert gas may also be employed to avoid contact with air.

As discussed above, the amino-poly(imidazoline-amide) products of this invention have a total amine number of at least about 75 to provide the desirable processability and dyeability properties. The amine number (total) of the products herein will generally not exceed about 250. The tertiary amine number will generally not exceed 200. As actually measured, the desirable resins of this invention had a ratio of tertiary amine to total amine of about as low as 0.34 (with the dimeric fat acid containing products) to as high as 0.65 (with the monomeric fat acid containing products). A general range of about 0.35 to 0.7 appears satisfactory with the preferred, as measured range being 0.45–0.65. The suitable resins had a theoretical ratio of tertiary amine to total amine number of at least 0.65.

The reactants which are heated for a time and temperature sufficient to provide the tertiary amine values as noted above, may be summarized as follows:

a. from about 20–50 equivalent percent of azelaic acid, b. 0, up to about 20 equivalent percent of another, different, aliphatic dicarboxylic acid having from 6–12 carbon atoms, c. 0, to not more than about 6 equivalent percent of a dimeric fat acid, d. 0, to not more than about 10 equivalent percent of a monomeric, monocarboxylic fatty acid having from 16–22 carbon atoms, e. about 25–40 equivalent percent of diethylene triamine, and f. about 15–30 equivalent percent of an alkylene diamine having 2–6 carbon atoms with the proviso that the sum of equivalent percents totals 100 and the sum of amine equivalent percent is at least equal to the carboxyl equivalent percent and the equivalent percent of diethylene triamine is at least about equal to the equivalent percent of said diamine, provided further that where a mixture of dimeric fat acid and said monomeric fatty acid is employed the total equivalent percent of said mixture shall not exceed about 11 equivalent percent.

The products of the present invention are employed with polymers of $\alpha$-olefins to provide dyeability thereto and are employed in an amount of from 0.1–10% and more preferably 1–5% by weight based on the amount of $\alpha$-olefin polymer. Generally, all normally solid polymers of the lower (2–4 carbon atoms) $\alpha$-olefins are useful. Copolymers of the monomers above mentioned may be employed as well as copolymers of these monomers and another co-monomer such as hexene-1, decene-1 or butadine. Particularly useful is polypropylene. The product of this invention may be combined with the polypropylene in various ways such as blending, melting, extruding milling, or other procedures.

In evaluating the products of the present invention with polypropylene as a dyeability additive, the crushed resin is dry blended with the polypropylene (Amoco grade 10–5013 or 11–5013) and co-extruded at 450° F. to effect the first stage of melt blending and then pelletized. The second stage of blending comes in the extruder which feeds the fiber die, the extruder being fed with pellets from the preliminary extrusion. The fibers emerging from the machine are drawn for greater strength, run through a water bath to cool, are dried and collected on spindles. Dyeing tests are conducted by treating the fibers with acid dyes of various hues in boiling water for two hours. A typical dye is Acid Nylon Red GLM (Allied Chemical). The dyeing uniformity and depth of color are evaluated by comparison with standard dyed fibers.

Processability tests include observation of fiber continuity and uniformity. If the additive does not blend well, or is incompatible, with the polypropylene the dye absorbs non-uniformly, frequently in a streaked or spotty manner. Fiber or film uniformity is measured with a micrometer and continuity involves fiber breakage records. More than two fiber breaks per hour of drawing is considered unsatisfactory.

The invention can be further illustrated by means of the following examples in which all parts and percentages are by weight unless otherwise indicated.

EXAMPLE I

This is a single stage preparation of an azelaic acid, diethylene triamine (DETA) and hexamethylene diamine (HMDA). The reactants and amounts were as follows:

|  | Reactant | | |
|---|---|---|---|
|  | Azelaic Acid | Diethylene Triamine | Hexamethylene Diamine* |
| Equivalent Weight | 94 | 51.5*** | 84.6** |
| Equivalent % | 46.7 | 36.6 | 16.7 |
| Equivalents | 7.0 | 5.5 | 2.5** |
| Grams | 658.0 | 283.7 | 211.4** |

*in form of 69% aqueous solution
**of aqueous solution
***considered difunctional as two nitrogens form an imidazoline ring Ten drops of phosphoric acid were also added as a catalyst to ensure complete reaction and 15 drops of an antifoam reagent (DC Antifoam - 1%) were added to minimize foaming. All ingredients were charged to a reactor equipped with a short Vigreaux column. With agitation, the reaction was brought to 200° C. over a period of 90 minutes during which all of the water of amidification came off. Over a period of 40 minutes, it was raised to 280° C. at which point 66% of the theory of imidazoline water had come off. Over the next 30 minutes, the temperature was raised to 295° C. yielding 81% of the water of theory. It was maintained at this temperature for another 40 minutes when no further water evolved. At this point, 87% theory had been achieved. The resin was allowed to cool rapidly to 200° C. at which point it was discharged. A very clear, pale yellow product resulted. The product had the following analysis:

| Total Amine No. | = 211 |
|---|---|
| Tertiary Amine No. | = 112 |
| Ratio: Tertiary to Total | = 0.54 |
| Ball and Ring Melting Point ° C. | = 86 |
| Viscosity, Thermocel, 190° C. | = 700 centipoises |

The product was evaluated for dyeability and processability as described earlier above. The product fully met the requirements for dyeability and processability.

EXAMPLE II

In this example the use of an optional monomeric fatty acid is illustrated.

In addition to the use of the phosphoric acid and antifoam reagent, the materials were as follows:

| Reactant | Equivalents (%) |
|---|---|
| Stearic Acid | 10 |
| Azelaic Acid | 40 |
| HMDA | 25 |
| DETA | 25 |

All of the HMDA and 94% of the azelaic acid, comprising Part B, were heated with stirring to 240° C. over a period of one hour and maintained there an hour. The reaction was then cooled to 200° C. and discharged.

All of the stearic acid and DETA and 6% of the azelaic acid, comprising Part A, were heated with stirring 1¼ hours to 260° C. and maintained there for 30 minutes. It was then cooled to 200° C. and the pulverized Part B was added. In 35 minutes it was heated to 250° C., in an additional hour to 265° C. and maintained there for 1½ hours. The product was cooled to 200° C. and discharged.

The product had a measured total amine number of 79 and a tertiary amine number of 51, providing a ratio of tertiary to total of 0.65. The product had a Ball and Ring Melting Point of 15° C. The product was evaluated for dyeability and processability and found to meet fully the requirements therefor.

EXAMPLE III

In this example, the use of a dimer acid is illustrated as an optional reactant. The dimer acid employed was one resulting from the polymerization of tall oil fatty acids and which was subsequently hydrogenated and distilled. The dimer acid had the following analysis:

| % M | = 1.0 |
|---|---|
| % I | = 4.7 |
| % D | = 92.7 |
| % T | = 1.6 |
| Saponification Value | = 195.6 |
| Iodine Value | = 13.2 |

In addition to the phosphoric acid and antifoam reagent the reactants were as follows:

| Reactant | Equivalents (%) |
|---|---|
| Dimer Acid | 6 |
| Azelaic Acid | 40 |
| DETA | 30 |
| HMDA | 24 |

The reactants were heated with stirring to 170° C. over a period of 1½ hours then to 280° C. in an additional hour. After maintaining at 280° C. for an additional hour, the product was cooled to 200° C. and discharged.

The product, which fully met the requirements for dyeability and processability, upon evaluation had a total amine number of 161, a tertiary amine number of 78, a ratio of tertiary to total amine of 0.48 and a Ball and Ring Melting Point of 133° C.

In another preparation of the same product, which, again, fully met the requirements for dyeability and processability, the product had a total amine number of 152, a tertiary amine number of 51, a ratio of tertiary to total amine of 0.34 and a Ball and Ring Melting Point of 130° C.

As indicated earlier, the compositions which meet the requirements for dyeability and processability are those prepared from the following reactants:

a. 20–50 equivalent percent of azelaic acid;

b. up to 50 equivalent percent of another, different, aliphatic, dicarboxylic acid having from 6 to 12 carbon atoms;

c. up to 6 equivalent percent of a dimeric fat acid;

d. not more than 10 equivalent percent of a monomeric, monocarboxylic fatty acid having from 16–22 carbon atoms;

e. 25–40 equivalent percent diethylene triamine; and f. 15–30 equivalent percent of an alkylene diamine having 2–6 carbon atoms.

In order to achieve products having such amounts of reactant materials, it is possible to melt blend and react two different, separate products, neither of which alone are satisfactory, but whose combined reactant composition, when so blended, meets the foregoing described amounts of reactants. This can be seen from the following Example IV.

EXAMPLE IV

PRODUCT A

This product was prepared from a lot of dimer acids similar to those of Example III, which analyzed as follows:

| | |
|---|---|
| % M | = 1.7 |
| % I | = 4.5 |
| % D | = 90.0 |
| % T | = 3.8 |
| Equivalent Weight | = 285 |
| Iodine Value | = 11.3 |
| Photometric Color | = 86.6% |

The reactants were as follows:

| Reactant | Equivalents (%) |
|---|---|
| Dimer Acid | 11 |
| Adipic Acid | 36 |
| HMDA | 24 |
| DETA | 29 |

The reactants were heated with stirring to 180° C. in a period of two hours while allowing water to be vented off while the reactor was under low pressure. Then, in one hour it was heated to 240° C. Where it was maintained for one hour. The product was then cooled rapidly to 210° C. at which point it was discharged from the reactor.

The resulting product had a total amine number of 142, a tertiary amine number of 74 and a Ball and Ring Melting Point of 167° C. While suitable alone from a dyeability standpoint, the product did not meet the requirements for processability.

PRODUCT B

The reactants and amounts were as follows:

| Reactant | Equivalents (%) |
|---|---|
| Stearic Acid | 10 |
| Azelaic Acid | 40 |
| HMDA | 28 |
| DETA | 22 |

The reactants were heated with stirring to 175° C. over a period of one hour. Water was vented, as necessary, to keep the reactor under only low pressure. After maintaining the 175° C. temperature for one hour it was raised in 45 minutes to 230° C. At this point, the heat exchange system failed and the reaction cooled to 180° C. before heat could be restored to raise it to 270° C. in a period of 70 minutes. After reaching this temperature, it was cooled to 210° C. and discharged.

The resulting product had a total amine number of 45, a tertiary amine number of 34 and a Ball and Ring Melting Point of 190° C. While suitable alone from a processability standpoint, the product alone did not meet the requirements for dyeability.

Products A and B were then blended to provide a product having the following composition which fully met the dyeability and processability requirements.

| Material | Equivalents (%) |
|---|---|
| Dimer Acid | 5.5 |
| Stearic Acid | 5.0 |
| Azelaic Acid | 20.0 |
| Adipic Acid | 18.0 |
| Diethylene Triamine | 25.5 |
| Hexamethylene Diamine | 26.0 |

The blended product had a total amine number of 93, a tertiary amine number of 54 and a ratio of tertiary to total amine of 0.58

The embodiments of the invention in which an exclusive property or privilege is claimed are defined as follows:

1. An amino-poly(imidazoline-amide) having a total amine number of at least 75 and a tertiary amine number of at least 50, formed as the reaction product at a temperature and time sufficient to provide said tertiary amine number of
   a. from about 20–50 equivalent percent of azelaic acid,
   b. up to about 20 equivalent percent of another, different, aliphatic, dicarboxylic acid having from 6 to 12 carbon atoms,
   c. up to not more than 6 equivalent percent of a dimeric fat acid,
   d. up to not more than 10 equivalent percent of a monomeric, monocarboxylic fatty acid having from 16–22 carbon atoms,
   e. about 25–40 equivalent percent of diethylene triamine and
   f. about 15–30 equivalent percent of an alkylene diamine having 2–6 carbon atoms wherein the sum of said equivalents percent total 100 and the sum of amine equivalents percent is at least about equal to the carboxyl equivalent percent and the equivalent percent of diethylene triamine is at least about equal to the equivalent percent of said diamine, provided further that where a mixture of said dimeric fat acid and said monomeric fatty acid is employed the total equivalent percent of said mixture shall not exceed 11 equivalent percent.

2. An amino-poly(imidazoline-amide) as defined in claim 1 wherein said alkylene diamine is hexamethylene diamine.

3. An amino-poly(imidazoline-amide) as defined in claim 1 wherein the measured ratio of tertiary amine to total amine number is in the range of about 0.35 to 0.70.

4. An amino-poly(imidazoline-amide) as defined in claim 1 wherein the measured ratio of tertiary amine to total amine number is in the range of 0.45 to 0.65.

5. An amino-poly(imidazoline-amide) as defined in claim 2 wherein said azelaic acid is present in an amount of about 47 carboxyl equivalent percent, said diethylene triamine is present in an amount of about 36 amine equivalent percent and said hexamethylene diamine is present in an amount of about 17 amine equivalent percent.

6. An amino-poly(imidazoline-amide) as defined in claim 2 wherein said azelaic acid is present in an amount of about 40 equivalent percent, said hexamethylene diamine is present in an amount of about 25 equivalent percent, said diethylene triamine is present in an amount of 25 equivalent percent and said monomeric fatty acid is stearic acid present in an amount of about 10 equivalent percent.

7. An amino-poly(imidazoline-amide) as defined in claim 2 wherein said azelaic acid is present in an amount of about 40 equivalent percent, said hexamethylene diamine is present in an amount of about 30 equivalent percent, said diethylene triamine is present in an amount of about 24 equivalent percent and said dimeric fat acid is present in an amount of 6 equivalent percent.

8. An amino-poly(imidazoline-amide) as defined in claim 7 wherein said dimeric fat acid consists essentially of polymerized tall oil fatty acids having a dimeric fat acid content greater than 90% by weight.

9. An amino-poly(imidazoline-amide) as defined in claim 2 wherein said azelaic acid is present in an amount of about 20 equivalent percent, said hexamethylene triamine is present in an amount of about 26 equivalent percent, said diethylene triamine is present in an amount of about 25 equivalent percent, said dimeric fat acid is present in an amount of 5.5 equivalent percent, said monomeric fatty acid is stearic acid and is present in an amount of about 5 equivalent percent and said different, aliphatic dicarboxylic acid is adipic acid and is present in an amount of about 18 equivalent percent.

* * * * *

UNITED STATES PATENT AND TRADEMARK OFFICE
CERTIFICATE OF CORRECTION

PATENT NO. : 4,049,598
DATED : September 20, 1977
INVENTOR(S) : Dwight E. Peerman, Dale G. Swan, H. Gordon Kanten It is certified that error appears in the above-identified patent and that said Letters Patent are hereby corrected as shown below:

Title Page (54), "amidazoline" should read – imidazoline

Col. 1, Title, "amidazoline" should read – imidazoline

Col. 1, line 5, insert ")" after amide

Col. 1, line 42, "polymers" should read – polymer

Col. 7, line 21, "numbe" should read – number

Col. 10, line 1, "15oC" should read – 175°C

Column 12, line 28, (Claim 1), insert "about" after "than".

Signed and Sealed this

*Seventh* Day of *March 1978*

[SEAL]

Attest:

RUTH C. MASON
*Attesting Officer*

LUTRELLE F. PARKER
*Acting Commissioner of Patents and Trademarks*